(12) United States Patent
Fujino et al.

(10) Patent No.: US 6,265,488 B1
(45) Date of Patent: Jul. 24, 2001

(54) PRODUCTION PROCESS FOR WATER-ABSORBING AGENT

(75) Inventors: Shinichi Fujino; Masatoshi Nakamura; Kinya Nagasuna, all of Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/253,858

(22) Filed: Feb. 21, 1999

(30) Foreign Application Priority Data

Feb. 24, 1998 (JP) .................................................. 10-042161

(51) Int. Cl.$^7$ ............................ C08L 33/02; C08L 63/00; C08F 8/14

(52) U.S. Cl. .................. 525/119; 525/329.5; 525/329.7; 525/384

(58) Field of Search ................................ 525/119, 329.5, 525/329.7, 384

(56) References Cited

U.S. PATENT DOCUMENTS

| | | |
|---|---|---|
| 4,043,952 | 8/1977 | Ganslaw et al. . |
| 4,051,086 | 9/1977 | Reid . |
| 4,587,308 | 5/1986 | Makita et al. . |
| 4,666,983 | 5/1987 | Tsubakimoto et al. . |
| 4,734,478 | 3/1988 | Tsubakimoto et al. . |
| 4,755,560 | 7/1988 | Ito et al. . |
| 4,758,617 | 7/1988 | Tanioku et al. . |
| 5,322,896 | 6/1994 | Ueda et al. . |
| 5,382,610 | 1/1995 | Harada et al. . |
| 5,384,368 | 1/1995 | Date et al. . |
| 5,409,771 | 4/1995 | Dahmen et al. . |
| 5,597,873 | 1/1997 | Chambers et al. . |
| 5,610,220 | 3/1997 | Klimmek et al. . |

FOREIGN PATENT DOCUMENTS

| | | |
|---|---|---|
| 40 20 780 C1 | 8/1991 | (DE) . |
| 0 555 692 B1 | 8/1993 | (EP) . |
| 0 618 005 B1 | 10/1994 | (EP) . |
| 51-136588 A | 11/1976 | (JP) . |
| 52-117393 A | 10/1977 | (JP) . |
| 58-180233 A | 10/1983 | (JP) . |
| 59-189103 A | 10/1984 | (JP) . |
| 60-163956 A | 8/1985 | (JP) . |
| 60255814 A | 12/1985 | (JP) . |
| 61-16903 A | 1/1986 | (JP) . |
| 61-211305 A | 9/1986 | (JP) . |
| 61-264006 A | 11/1986 | (JP) . |
| 61252212 A | 11/1986 | (JP) . |
| 61257235 A | 11/1986 | (JP) . |
| 61-293228 | 12/1986 | (JP) . |
| 62007745 A | 1/1987 | (JP) . |
| 01292004 A | 11/1989 | (JP) . |
| 02153903 A | 6/1990 | (JP) . |
| 6-287220 A | 10/1994 | (JP) . |
| 8-508517 A | 9/1996 | (JP) . |

OTHER PUBLICATIONS in C. Orr, "Size Measurement of Particles", Kirk–Othmer Ency. of Chem. Tech., 3rd ed., John Wiley & Sons, New York, vol. 21, pp. 10–131 (1983).*

\* cited by examiner

*Primary Examiner*—Donald R. Wilson

(57) ABSTRACT

The invention provides a process for producing a water-absorbing agent by using a crosslinking agent of high molecular weight, wherein the water-absorbing agent is excellent with good balance in respect to the absorption capacities under no load and under a heavy load and can display excellent absorption properties even if the weight percentage of the water-absorbent resin (resin concentration) is high when the water-absorbent resin is used for materials such as hygienic products. In a production process for a water-absorbing agent comprising the steps of mixing a water-absorbent resin with a crosslinking agent and heating the resultant mixture wherein the water-absorbent resin has a carboxyl group; the invention is characterized in that the crosslinking agent has a group reactable upon the carboxyl group, an average molecular weight of 500 or more, and a repeating structural unit of general formula (1) below:

$$-[(CH_2CH_2O)_m-CH_2-CH(OH)CH_2-O]- \quad (1)$$

wherein m is an integer of 1 to 10.

18 Claims, 1 Drawing Sheet

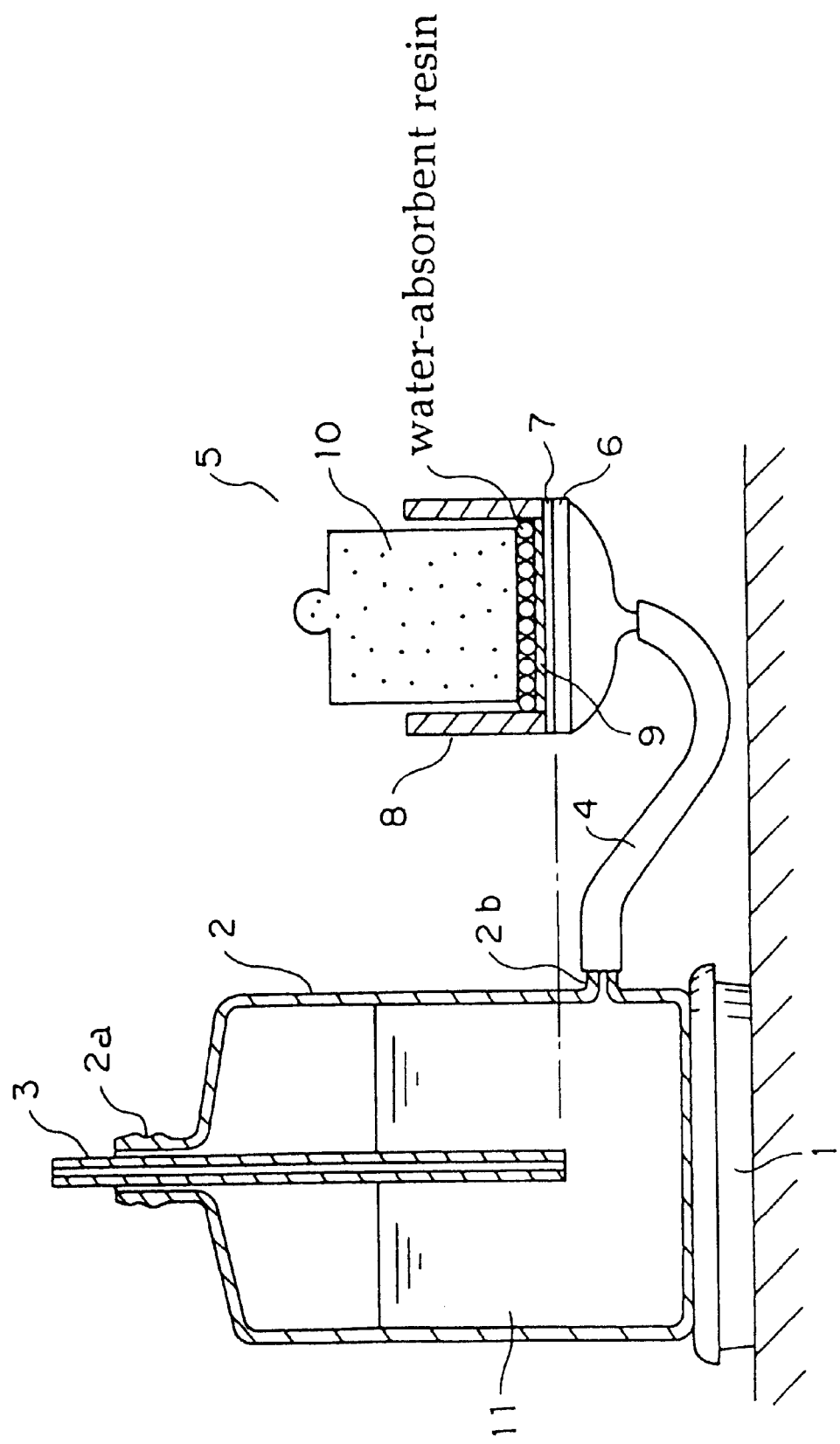

PRODUCTION PROCESS FOR WATER-ABSORBING AGENT

BACKGROUND OF THE INVENTION

A. Technical Field

The present invention relates to a production process for a water- absorbing agent which is favorably used for sanitary materials such as paper-made diapers (disposable diapers), sanitary napkins and so-called incontinent pads.

B. Background Art

In recent years, water-absorbent resins are widely used as constituent materials of sanitary materials, such as disposable diapers, sanitary napkins, and so-called incontinent pads, for the purpose of causing the water-absorbent resins to absorb body fluids.

Known examples of the above water-absorbent resins are as follows: crosslinked polymers of partially neutralized polyacrylic acids; hydrolyzed products of starch-acrylic acid graft polymers; saponified products of vinyl acetate-acrylic acid ester copolymers; hydrolyzed products of acrylonitrile- or acrylamide copolymers, and their crosslinked polymers; and crosslinked polymers of cationic monomers.

Examples of the properties which the above water-absorbent resins should have are as follows: upon contact with aqueous liquids such as body fluids, excellent water absorption amount or speed, the liquid permeability, the gel strength of the swollen gel, the suction power to suck up water from a base material containing aqueous liquids. However, relations between these properties do not necessarily display positive correlations. For example, as the absorption capacity under no load increases, the absorption properties under a load deteriorate.

As to a method for improving such water-absorption properties of the water-absorbent resin in good balance, there is a known art in which the neighborhood of the surface of the water-absorbent resin is crosslinked, and various methods have been proposed as such.

For example, there are known methods in which the following materials are used as the crosslinking agents: polyhydric alcohols (JP-A-58-180233 and JP-A-61-016903); polyglycidyl compounds, polyaziridine compounds, polyamine compounds, or polyisocyanate compounds (JP-A-59-189103); glyoxal (JP-A-52-117393); polyvalent metals (JP-A-51-136588, JP-A-61-257235 and JP-A-62-007745); silane coupling agents (JP-A-61-211305, JP-A-61-252212, and JP-A-61-264006); alkylene carbonates (DE 4020780). In addition, there are also known methods in which the following materials are allowed to be present for the purpose of improving the dispersibility of the crosslinking agent during the crosslinking reaction: inert inorganic powders (P-A-60-163956 and JP-A-60-255814); dihydric alcohols (JP-A-01-292004); water along with ether compounds (JP-A-02-153903); alkylene oxide adducts of monohydric alcohols, or organic acid salts, or lactams (EP 555692); and phosphoric acid (Publication of Internal Patent Application as entered the national phase in Japan (Kohyo) No. 08-508517).

However, there are cases where conventional arts of crosslinking the neighborhood of the surface of the water-absorbent resin cannot sufficiently meet the abilities as demanded to the water-absorbent resin to a high degree in recent years. For example, in recent years, the sanitary materials have a tendency to be designed to be thinned, so the water-absorbent resin concentration in the absorbent structure becomes high. Thus, excellent absorption capacities under no load and under a heavy load with good balance are exemplified as the properties that are desired to the water-absorbent resin in the absorbent structure which contains the water-absorbent resin in a large quantity, namely, high concentration, but the above conventional methods are still insufficient to further raise each of the above values.

Furthermore, there is a problem of the safety of the crosslinking agent as used. Generally, as the molecular weights of compounds decrease, their perviousness from skin increases. In addition, when the crosslinking agent has high reactive groups such as epoxy group, the crosslinking agent itself has property to stimulate skin, so it is preferable to use a crosslinking agent of high molecular weight in view of the safety. However, there have been problems so far in that the use of a high molecular crosslinking agent with an epoxy group makes it very difficult to improve the absorption properties under a load. In other words, it is also difficult to achieve the safety and the absorption properties simultaneously. Then this problem is great especially when the crosslinking agent with an epoxy group.

In addition, there are also known methods in which the following other high molecular crosslinking agents are, for example, used: those which have both epoxy and amino groups (JP-A-61-293228), cationic ones (U.S. Pat. No. 5,382,610), polyamidoepichlorohydrin adducts or polyamineepichlorohydrin adducts (U.S. Pat. No. 5,597, 872, JP-A-06-287220). However, these high molecular crosslinking agents all have a cationic group to form complexes with water-absorbent resins having an anionic group, so the uniform crosslinking is difficult to carry out, and the absorption capacity under a heavy load might be difficult to enhance. In addition, the high molecules as used in U.S. Pat. No. 5,597,872, JP-A-06-287220 are also still insufficient to the safety, because low molecular epichlorohydrin to be added tends to remain in the high molecules and therefore increases the halogen content of the water-absorbent resin by being added thereto.

Therefore, as things are, the above prior arts still do not satisfy either the aspect of safety or the properties of the resin.

SUMMARY OF THE INVENTION

A. Objects of the Invention

The present invention was made considering the above problems on the prior arts, and it is an object of the present invention to provide a production process for a water-absorbing agent which is excellent with good balance in respect to the absorption capacities under no load and under a heavy load and can display excellent absorption properties even if the weight percentage of the water-absorbent resin (resin concentration) is high when the water-absorbent resin is used for materials such as sanitary materials. In addition, it is another object of the present invention to provide a production process for a water-absorbing agent which can display the absorption properties excellent with good balance in respect to the absorption capacities under no load and under a heavy load even if the crosslinking agent with high molecular weight is used.

B. Disclosure of the Invention

The present inventors studied and studied with encouragement to themselves and great efforts to solve the above problems. As a result, the inventors completed the present invention by finding that the use of a crosslinking agent with a specific structure can achieve the absorption properties excellent with good balance in respect to the absorption capacities under no load and under a heavy load even if the crosslinking agent has a high molecular weight.

Thus, a production process for a water-absorbing agent, according to the present invention, comprises the steps of mixing a water-absorbent resin with a crosslinking agent and heating the resultant mixture, wherein the water-absorbent resin has a carboxyl group;

and this process is characterized in that the crosslinking agent has a group reactable upon the carboxyl group, an average molecular weight of 500 or more, and a repeating structural unit of general formula (1) below:

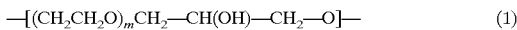
(1)

wherein m is an integer of 1 to 10.

Another production process for a water-absorbing agent, according to the present invention, comprises the steps of mixing a water-absorbent resin with a crosslinking agent and heating the resultant mixture, wherein the water-absorbent resin has a carboxyl group;

and this process is characterized in that the crosslinking agent has an average molecular weight of 500 or more and is shown by general formula (2) below:

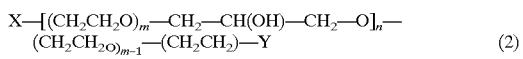
(2)

wherein: m is an integer of 1 to 10;

X and Y are units that include a functional group reactable upon a carboxyl group, wherein X and Y may be either the same as or different from each other; and n is an integer of 3 or more.

Yet another production process for a water-absorbing agent, according to the present invention, comprises the steps of mixing a water-absorbent resin with a crosslinking agent and heating the resultant mixture, wherein the water-absorbent resin has a carboxyl group;

and this process is characterized in that the crosslinking agent is a polyepoxy compound which has at least two hydroxyl groups and an average molecular weight of 1,000 or more.

In addition, the present inventors paid attention to the below-mentioned new parameter "crosslinking absorption property index" in selecting surface-crosslinking agents from standpoints of the safety and the absorption properties, and led to a thought that the use of a crosslinking agent with a specific or larger value of this parameter can give the water-absorbing agent favorable for the object of the present invention, thus completing the following inventions.

Thus, yet another production process for a water-absorbing agent, according to the present invention, comprises the steps of mixing a water-absorbent resin with a surface-crosslinking agent and heating the resultant mixture, wherein the water-absorbent resin has a carboxyl group;

and this process is characterized in that the surface-crosslinking agent has no cationic group and in that the resultant water-absorbing agent in that the resultant water absorbing agent displays a crosslinking absorption property index of $1,000 \times 10^3$ or more, wherein the index is defined by the following equation:

$$\text{crosslinking absorption property index} = A \times B \times C$$

wherein:

A is an average molecular weight of the surface-crosslinking agent for the water-absorbent resin;

B is an absorption capacity (g/g) under no load of the resultant water-absorbing agent;

C is an absorption capacity (g/g) under a heavy load of the resultant water-absorbing agent.

Furthermore, a water-absorbing agent, according to the present invention, is a water-absorbing agent as obtained by a process involving using a surface-crosslinking agent which has no cationic group wherein the resultant water absorbing agent displays a crosslinking absorption property index of $1,000 \times 10^3$ or more, wherein the index is defined by the above equation.

These and other objects and the advantages of the present invention will be more fully apparent from the following detailed disclosure.

BRIEF DESCRIPTION OF THE DRAWING

FIG. 1 is a schematic section of an apparatus as used to measure the absorption capacity under a heavy load which is one of the properties as displayed by the water-absorbent resin.

DETAILED DESCRIPTION OF THE INVENTION

Hereinafter, the present invention is explained in detail.

The water-absorbent resin, which is used to produce the water-absorbing agent of the present invention, is not especially limited if it has a carboxyl group, but this water-absorbent resin is a conventionally known resin that is typically obtained by polymerizing and crosslinking monomers (of which the main component is either one or both of acrylic acid and a salt (neutralized product) thereof) and absorbs as large a quantity of water as 50~1,000 times the original in deionized water to thereby form a hydrogel. In addition, as to the above water-absorbent resin, those which have an uncrosslinked water-soluble content of 25 weight % or below, preferably 15 weight % or below, more preferably 10 weight % or below, are used.

Examples of the above salt of acrylic acid include: alkaline metal salts, ammonium salts, and amine salts of acrylic acid. It is preferable that the constituent units of the above water-absorbent resin comprise acrylic acid of 10~40 mol % and its salt of 90~60 mol % (wherein the total of both is 100 mol %). The monomers, as used to produce the water-absorbent resin by polymerizing hydrophilic monomers (of which the main component is either one or both of acrylic acid and a salt thereof), may, if necessary, comprise not only acrylic acid or a salt thereof, but also monomers other than acrylic acid.

The monomers other than acrylic acid are not especially limited, but specified examples of them include the following: anionic unsaturated monomers, such as methacrylic acid, maleic acid, vinylsulfonic acid, styrenesulfonic acid, 2-(meth)acrylamido-2-methylpropanesulfonic acid, 2-(meth)acryloylethanesulfonic acid, and 2-(meth) acryloylpropanesulfonic acid, and their salts; nonionic unsaturated monomers containing a hydrophilic group, such as acrylamide, methacrylamide, N-ethyl(meth)acrylamide, N-n-propyl(meth)acrylamide, N-isopropyl(meth) acrylamide, N,N-dimethyl(meth)acrylamide, 2-hydroxyethyl (meth)acrylate, 2-hydroxypropyl (meth) acrylate, methoxypolyethylene glycol (meth)acrylate, polyethylene glycol mono(meth)acrylate, vinylpyridine, N-vinylpyrrolidone, N-acryloylpiperidine, and N-acryloylpyrrolidine; cationic unsaturated monomers such as N,N-dimethylaminoethyl (meth)acrylate, N,N-diethylaminoethyl (meth)acrylate, N,N-dimethylaminopropyl(meth)acrylate, N,N-dimethylaminopropyl(meth)acrylamide, and their quaternary salts. These monomers may be used either alone respectively or in combinations with each other.

In the present invention, when the monomers other than acrylic acid are used, the ratio of them is preferably 30 mol % or below, more preferably 10 mol % or below, of the total with acrylic acid and its salt. If the above monomers other than acrylic acid are used in the above ratio, then the water-absorption properties of the resultant water-absorbent resin are still more improved, and the water-absorbent resin is obtainable at a still lower cost.

When the above hydrophilic monomer (of which the main component is acrylic acid or a salt thereof) is polymerized to obtain the water-absorbent resin as used in the present invention, bulk polymerization or precipitation polymerization can be carried out. However, considering the performance or the easiness of the polymerization control, it is preferable to carry out aqueous solution polymerization or reversed-phase suspension polymerization using the above hydrophilic monomer in the form of its aqueous solution. Incidentally, when the monomer is used in the form of its aqueous solution, the concentration of the monomer in its aqueous solution (hereinafter referred to as "aqueous monomer solution") is not especially limited, but is preferably in the range of 10~70 weight %, more preferably 20~40 weight %. In addition, when the above aqueous solution polymerization or reversed-phase suspension polymerization is carried out, a solvent other than water may be jointly used if necessary, and the kind of the solvent as jointly used is not especially limited.

When the above polymerization is initiated, the following radical polymerization initiators, for example, can be used: potassium persulfate, ammonium persulfate, sodium persulfate, t-butyl hydroperoxide, hydrogen peroxide, and 2,2'-azobis(2-aminodipropane) dihydrochloride.

Furthermore, a redox initiator is also available by further using a reductant to promote decomposition of the above polymerization initiator and combining both with each other. Examples of the above reductant include the following: (bi)sulfurous acid salts such as sodium sulfite and sodium hydrogensulfite; L-ascorbic acid (or its salts); reducible metals (or their salts) such as ferrous salts; and amines. However, the reductant is not especially limited to them.

The amount of the above polymerization initiator as used is usually in the range of 0.001~2 mol %, preferably 0.01~0.1 mol %. In the case where the amount of the polymerization initiator is less than 0.001 mol %, there are disadvantages in that a large amount of monomers remain unreacted, so the amount of monomers, remaining in the resultant water-absorbent resin, increases. On the other hand, in the case where the amount of the polymerization initiator exceeds 2 mol %, there might be disadvantages in that the water-soluble content in the resultant water-absorbent resin increases.

In addition, the polymerization reaction may be initiated by irradiating the reaction system with active energy rays, such as radiations, electron beam, and ultraviolet rays, instead of using the polymerization initiators. Incidentally, the reaction temperature in the above polymerization reaction is not especially limited, but is preferably in the range of 20~90° C. In addition, the reaction time is not especially limited either and may fitly be set according to factors such as the respective kinds of the hydrophilic monomers and polymerization initiators and the reaction temperature.

The water-absorbent resin, used in the present invention, may be a self-crosslinking type using no crosslinking agent, but preferable ones are those which are copolymerized or reacted with an internal-crosslinking agent having 2 or more polymerizable unsaturated groups or 2 or more reactive groups per molecule.

Specified examples of the above internal-crosslinking agent include the following: N,N-methylenebis(meth)acrylamide, (poly)ethylene glycol (meth)acrylate, (poly)propylene glycol di(meth)acrylate, trimethylolpropane tri(meth)acrylate, glycerol tri(meth)acrylate, glycerol acrylate methacrylate, ethylene-oxide-denatured trimethylolpropane tri(meth)acrylate, pentaerythritol hexa(meth)acrylate, triallyl cyanurate, triallyl isocyanurate, triallyl phosphate, triallylamine, poly(meth)allyloxyalkanes, (poly)ethylene glycol diglycidyl ether, glycerol diglycidyl ether, ethylene glycol, polyethylene glycol, propylene glycol, glycerol, pentaerythritol, ethylenediamine, ethylene carbonate, propylene carbonate, polyethylenimine, and glycidyl (meth)acrylate.

These internal-crosslinking agents may be used either alone respectively or in combinations with each other. In addition, these internal-crosslinking agents may be added to the reaction system either all at once or divisionally. When 2 or more kinds of internal-crosslinking agents are used, it is preferable to essentially use a compound with 2 or more polymerizable unsaturated groups, considering the absorption properties of the resultant water-absorbent resin.

The amount of the above internal-crosslinking agent as used is preferably in the range of 0.005~2 mol %, more preferably 0.01~1 mol %, of the above hydrophilic monomers. In the respective cases where the amount of the internal-crosslinking agent is smaller than 0.005 mol % and where the amount of the internal-crosslinking agent exceeds 2 mol %, the water-absorbent resin having the desired water absorption properties might not be obtained.

When the crosslinking structure is introduced into the internal portion of the water-absorbent resin using the above internal-crosslinking agent, the internal-crosslinking agent may be added to the reaction system during or after polymerization, or after polymerization and neutralization, of the above hydrophilic monomers.

Incidentally, in the above polymerization, the following materials may be added to the reaction system: various foaming agents such as carbonates (or hydrogencarbonates), carbon dioxide, azo compounds, and inert organic solvents; hydrophilic polymers such as starch-cellulose, derivatives thereof, polyvinyl alcohol, polyacrylic acid (or its salts), and crosslinked polymers of polyacrylic acid (or its salts); various surface-active agents; and chain transfer agents such as hypophosphorous acid (or its salts).

When the water-absorbent resin as obtained by the above polymerization reaction is a gel, the above water-absorbent resin is usually dried and, if necessary, pulverized.

The water content of the water-absorbent resin, usable in the present invention, is not especially limited, but it usually in the range of about 1~about 400%. Conventional surface-crosslinking agents need to strictly be controlled with regard to the water content, because the water content greatly influences the permeability of the surface-crosslinking agent into resin particles. However, as to the crosslinking agent of the present invention, water-absorbent resins having the wide range of water content are usable. The water content is preferably in the range of 1~40%, more preferably 1~10%. In addition, the particle diameter of the water-absorbent resin, usable in the present invention, may exceed 1,000 µm in terms of average particle diameter of gels that is obtained by the polymerization reaction and has not been dried or pulverized yet. However, the particle diameter is usually in the range of 10~1,000 µm, preferably 50~800 µm, more preferably 75~600 µm, particularly preferably 150~500 µm, on the average. The particle shape of the water-absorbent resin as obtained in this way, for example, may be spherical, pulverized, or irregular, and is not especially limited, but those which have the irregular pulverized shapes, as obtained via the pulverization step, are preferably used.

As to the water-absorbent resin as obtained by the above method, it is preferable to use those which display a high absorption capacity value of 40 g/g or more, preferably 45 g/g or more, under no load, because the effects of the present invention are remarkably shown by such a resin. Of course, the above absorption capacity is fitly adjusted according to the purpose.

The present invention can be achieved by mixing a water-absorbent resin with a crosslinking agent and heating the resultant mixture, wherein the water-absorbent resin is obtainable by the above polymerization and has a carboxyl group, and the crosslinking agent has a specific structure.

A crosslinking agent, usable in the present invention, has a group reactable upon a carboxyl group, an average molecular weight of 500 or more, and a repeating structural unit of general formula (1) below:

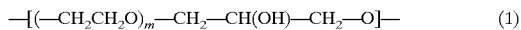

wherein m is an integer of 1 to 10.

The repeating unit of this crosslinking agent has a hydroxyl group and is, for example, obtainable by reacting polyethylene glycol with 1~10 ethylene oxide chains upon epihalohydrin compounds such as epichlorohydrin. Particularly preferable ones are obtainable by reacting ethylene glycol upon epichlorohydrin.

In addition, examples of the group, reactable upon the carboxyl group, in this crosslinking agent include epoxy groups, such as glycidyl group, and hydroxyl group, and these groups may coexist. However, in view of the reactivity, the epoxy groups such as glycidyl group are preferable, and it is more preferable that at least two epoxy groups coexist.

In addition, the average molecular weight of this crosslinking agent needs to be 500 or above, and is preferably 1,000 or above, more preferably in the range of 1,000~3,000. Average molecular weights less than 500 are unfavorable particularly in the case of the epoxy group, because they might cause the aforementioned problems on the safety.

This crosslinking agent is characteristic in that it has a high molecular weight and is therefore greatly limited with regard to permeation from the surface of the water-absorbent resin and hardly lowers the absorption capacity what is called absorption capacity under no load of the water-absorbent resin during surface-crosslinking. Furthermore, conventional crosslinking agents with such a high molecular weight merely has low affinity to the water-absorbent resin surface and therefore cannot give the water-absorbing agent with high absorption capacity under a heavy load, whereas the above crosslinking agent usable in the present invention has no cationic group but has the specific structural unit, so its affinity to the water-absorbent resin surface is optimized. Therefore such a crosslinking agent can give the water-absorbing agent with high absorption capacity under a heavy load.

Accordingly, the water-absorbing agent, as produced by the present invention production process involving the use of the above crosslinking agent, has advantages, in spite of the high molecular weight of the crosslinking agent as used, in that this water-absorbing agent hardly deteriorates with regard to the absorption capacity under no load, and is improved with regard to the absorption capacity under a heavy load, and further, displays excellent absorption properties even if the resin concentration is high when the water-absorbing agent is used for materials such as sanitary ones.

Another crosslinking agent, usable in the present invention, has an average molecular weight of 500 or more and is shown by general formula (2) below:

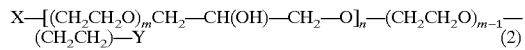

wherein: m is an integer of 1 to 10;

X and Y are functional groups reactable upon a carboxyl group, wherein X and Y may be either the same as or different from each other; and n is an integer of 3 or more.

The repeating unit of this crosslinking agent, similarly to the above-mentioned one, has a hydroxyl group and is, for example, obtainable by reacting polyethylene glycol with 1~10 ethylene oxide chains upon epihalohydrin compounds such as epichlorohydrin. Particularly preferable ones are obtainable by reacting ethylene glycol upon epichlorohydrin.

In addition, the groups X and Y in this crosslinking agent are groups reactable upon the carboxyl group and may be either the same as or different from each other, and examples thereof include epoxy groups, such as RO group (R is glycidyl group), and hydroxyl group. However, in view of the reactivity, the RO group (R is glycidyl group) is preferable.

In addition, m in this crosslinking agent is an integer of 1~10, particularly preferably m=1. The values of m exceeding 10 are unfavorable, because they strengthen the hydrophobicity of the crosslinking agent and lower the affinity of the crosslinking agent to the water-absorbent resin.

In addition, the average molecular weight of this crosslinking agent needs to be 500 or above, and is preferably 1,000 or above, more preferably in the range of 1,000~3,000. Average molecular weights less than 500 are unfavorable, because they might cause the aforementioned problems on the safety.

This crosslinking agent is, similarly to the above-mentioned one, characteristic in that it has a high molecular weight and is therefore greatly limited with regard to permeation from the surface of the water-absorbent resin and hardly lowers the absorption capacity what is called absorption capacity under no load of the water-absorbent resin during surface-crosslinking. Furthermore, conventional crosslinking agents with such a high molecular weight merely has low affinity to the water-absorbent resin surface and therefore cannot give the water-absorbing agent with high absorption capacity under a heavy load, whereas the above crosslinking agent usable in the present invention has the specific structural unit, so its affinity to the water-absorbent resin surface is optimized. Therefore such a crosslinking agent can give the water-absorbing agent with high absorption capacity under a heavy load.

Accordingly, the water-absorbing agent, as produced by the present invention production process involving the use of the above crosslinking agent, has advantages, in spite of the high molecular weight of the crosslinking agent as used, in that this water-absorbing agent hardly deteriorates with regard to the absorption capacity under no load, and is improved with regard to the absorption capacity under a heavy load, and further, displays excellent absorption properties even if the resin concentration is high when the water-absorbing agent is used for materials such as sanitary ones.

Yet another crosslinking agent, usable in the present invention, is a polyepoxy compound which has at least two hydroxyl groups and an average molecular weight of 1,000 or more.

This crosslinking agent, in spite of its high molecular weight, enhances the absorption capacity under a heavy load, because the hydroxyl group optimizes the affinity of the crosslinking agent to the water-absorbent resin surface In addition, the average molecular weight of this crosslinking agent needs to be 1,000 or above, preferably in the range of 1,000~3,000. Average molecular weights of 1,000 or below are unfavorable, because they might cause the aforementioned problems on the safety.

This crosslinking agent is, similarly to the above-mentioned one, characteristic in that it has a high molecular weight and is therefore greatly limited with regard to permeation from the surface of the water-absorbent resin and hardly lowers the absorption capacity what is called absorption capacity under no load of the water-absorbent resin during surface-crosslinking. Furthermore, conventional crosslinking agents with such a high molecular weight merely has low affinity to the water-absorbent resin surface and therefore cannot give the water-absorbing agent with high absorption capacity under a heavy load, whereas the above crosslinking agent usable in the present invention has the specific structural unit, so its affinity to the water-absorbent resin surface is optimized. Therefore such a crosslinking agent can give the water-absorbing agent with high absorption capacity under a heavy load.

Accordingly, the water-absorbing agent of the present invention has advantages, in spite of the high molecular weight of the crosslinking agent as used, in that this water-absorbing agent hardly deteriorates with regard to the absorption capacity under no load, and is improved with regard to the absorption capacity under a heavy load, and further, displays excellent absorption properties even if the resin concentration is high when the water-absorbing agent is used for materials such as sanitary ones.

The amount of the above-mentioned crosslinking agent, usable in the present invention, is in the range of about 0.001~ about 10 weight parts per 100 weight parts of the water-absorbent resin. Amounts exceeding 10 weight parts are unfavorable, not only because they are uneconomical, but also because they are excessive to the formation of the optimum crosslinking structure in the water-absorbing agent. Furthermore, amounts smaller than 0.001 weight parts make it difficult to obtain effects of improving the properties of the water-absorbing agent such as absorption capacity under a load.

In the present invention, it is preferable to use water when the water-absorbent resin is mixed with the crosslinking agent. The amount of water, as used, is different according to factors such as the kind, particle diameter, or water content of the water-absorbent resin, but is in the range of preferably 0~20 weight parts (but not including zero), more preferably 0.5~10 weight parts.

In addition, when the water-absorbent resin is mixed with the crosslinking agent or its aqueous solution, hydrophilic organic solvents or third substances may be used as the solvent to raise the miscibility.

When the hydrophilic organic solvent is used, examples thereof include the following: lower alcohols such as methyl alcohol, ethyl alcohol, n-propyl alcohol, isopropyl alcohol, n-butyl alcohol, isobutyl alcohol, and t-butyl alcohol; ketones such as acetone; ethers such as dioxane, tetrahydrofuran, and methoxy(poly)ethylene glycol; amides such as ε-caprolactam and N,N-dimethylformamide; and suffoxides such as dimethyl sulfoxide. The amount of the hydrophilic organic solvent as used is different according to factors such as the kind, particle diameter, or water content of the water-absorbent resin, but is preferably 20 weight parts or below, more preferably in the range of 0.1~10 weight parts, per 100 weight parts of the solid content of the water-absorbent resin. In addition, inorganic acids, organic acids, or polyamino acids, as disclosed in EP 0668080, may be allowed to coexist as third substances.

A second surface-crosslinking agent may further be used if it does not hinder the effects of the crosslinking agent as used in the present invention. Examples of the second surface-crosslinking agent include the following: polyhydric alcohol compounds such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerol, polyglycerol, 2-butene-1,4-diol, 1,3-butanediol, 1,4-butanediol, 1,5-pentanediol, 1,6-hexanediol, 1,2-yclohexanedim ethanol, 1,2-cyclohexanol, trimethylolpropane, diethanolamine, triethanolamine, polyoxypropylene, oxyethylene-oxypropylene block copolymer, pentaerythritol and sorbitol; epoxy compounds such as ethylene glycol diglycidyl ether, polyethylene diglycidyl ether, glycerol polyglycidyl ether, diglycerol polyglycidyl ether, polyglycerol polyglycidyl ether, propylene glycol diglycidyl ether, polypropylene glycol diglycidyl ether and glycidol; polyamine compounds, such as ethylenediamine, diethylenetriamine, triethylenatetraamine, tetraethylenepentaamine, pentaethylenetetraamine and polyethylenimine, and their inorganic or organic salts (for example, azetidinium salts); polyisocyanate compounds such as 2,4-tolylene diisocyanate and hexamethylene diisocyanate; polyoxazoline compounds such as 1,2-ethylenebisoxazoline; alkylene carbonate compounds such as 1,3-dioxolan-2-one, 4-methyl-1,3-dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one and 1,3-dioxopan-2-one; haloepoxy compounds, such as epichlorohydrin, epibromohydrin and a-methylepichlorohydrin, and their polyamine adducts (for example, Kymene made by Hercules: registered trademark); silane coupling agents such as γ-glycidoxypropyltrimethoxysilane and γ-aminopropyltriethoxysilane; and polyvalent metallic compounds such as hydroxides and chlorides of zinc, calcium, magnesium, aluminum, iron and zirconium.

When the water-absorbent resin is mixed with the crosslinking agent as used in the present invention, it is, for example, permissible to mix the crosslinking agent with a dispersion as prepared by dispersing the water-absorbent resin into the above hydrophilic organic solvent, but the mixing method is not especially limited. In a preferable method among various mixing methods, the crosslinking agent (if necessary, in the form of solution with either one or both of water and the hydrophilic organic solvent) is directly sprayed or dropped to the water-absorbent resin, thereby mixing them. In addition, when water is used for mixing, a water-insoluble fine particle powder or a surface-active agent may be allowed to coexist.

It is preferable that the mixing apparatus, as used to mix the water-absorbent resin and the crosslinking agent in the present invention, has a great mixing force to mix both materials uniformly and surely. Preferable examples of the above mixing apparatus include the following: cylinder type mixers, double-wall cone type mixers, V-character-shaped mixers, ribbon type mixers, screw type mixers, fluidized-furnace rotary disk type mixers, gas current type mixers, double-arm type kneaders, internal mixers, pulverizing type kneaders, rotary mixers, and screw type extruders, and more preferable ones are high-speed agitation type mixers.

After mixing the water-absorbent resin and the crosslinking agent, the heating treatment is carried out to run the crosslinking reaction. The temperature of the above heating treatment is different according to the type of the crosslinking agent as used, but is preferably in the range of 40~250° C. In the case where the treatment temperature is lower than 40° C., the uniform crosslinking structure might not be formed, so the water-absorbing agent, excellent in the high balance between the absorption capacities under no load and under a heavy load, might not be obtainable. In the case where the treatment temperature exceeds 250° C., the deterioration of the water-absorbent resin might occurs to degrade the performance of the water-absorbing agent, so caution is necessary.

The above heating treatment can be carried out using conventional dryers or heating-furnaces. Examples of the dryers include the following: channel type mixing dryers, rotary dryers, desk dryers, fluidized-bed dryers, gas-stream type dryers, and infrared dryers.

The above-mentioned production process of the present invention can give a water-absorbing agent which is excellent in the high balance between the absorption capacities under no load and under a heavy load and in the safety and can display excellent absorption properties even if the weight percentage of the water-absorbent resin (resin concentration) is high when the water-absorbent resin is used for materials such as sanitary materials, wherein the absorption capacity under a heavy load is usually 20 g/g or more, preferably 25 g/g or more, and the absorption capacity under no load is usually 35 g/g or more, preferably 40 g/g or more. Such high balance has not been achieved so far by the surface-crosslinking of the water-absorbent resin with conventionally known crosslinking agents of 500 or more in molecular weight.

Another production process for a water-absorbing agent, according to the present invention, comprises the steps of mixing a water-absorbent resin with a surface-crosslinking agent and heating the resultant mixture, wherein the water-absorbent resin has a carboxyl group;

and this process is characterized in that the surface-crosslinking agent has no cationic group and in that the resultant water-absorbing agent displays a crosslinking absorption property index of $1,000 \times 10^3$ or more, wherein the index is defined by the following equation:

$$\text{crosslinking absorption property index} = A \times B \times C$$

wherein:

A is an average molecular weight of the surface-crosslinking agent for the water-absorbent resin;

B is an absorption capacity (g/g) under no load of the resultant water-absorbing agent;

C is an absorption capacity under a heavy load of the resultant water-absorbing agent.

The above crosslinking absorption property index, which is a new parameter, is defined as above, and a larger value thereof shows that the molecular weight of the surface-crosslinking agent, as used, is higher, and that the absorption capacities under no load and under a heavy load of the resultant water-absorbing agent are more excellent with better balance.

Furthermore, a water-absorbing agent, according to the present invention, is a water-absorbing agent as obtained by a process involving using a surface-crosslinking agent which has no cationic group wherein the resultant water absorbing displays a crosslinking absorption property index of $1,000 \times 10^3$ or more, wherein the index is defined by the above equation. Such a water-absorbing agent is excellent with better balance in respect to the absorption capacities under no load and under a heavy load.

In addition, in the present invention, various functions also can be given to the above water-absorbing agents by further adding thereto the following materials: disinfectants; deodorants; antimicrobial agents;

perfumes; various inorganic powders; foaming agents; pigments; dyes; hydrophilic short fibers; manure; oxidants; reductants; water; and salts.

Furthermore, as is mentioned above, the above water-absorbing agent is particularly favorable for various absorbent articles, particularly, absorbent articles such as sanitary materials (e.g. disposable diapers, sanitary napkins, incontinent pads) that include absorbent structures and are thinned more and more.

(Effects and Advantages of the Invention):

The production process of the present invention can give a water-absorbing agent which is excellent with good balance in respect to the absorption capacities under no load and under a heavy load and can display excellent absorption properties even if the weight percentage of the water-absorbent resin (resin concentration) is high when the water-absorbent resin is used for materials such as sanitary materials. In addition, the production process of the present invention can give a water-absorbing agent which can display the absorption properties that is excellent with good balance in respect to the absorption capacities under no load and under a heavy load even if a crosslinking agent of high molecular weight is used.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to these examples. Incidentally, the performances of the water-absorbing agent were measured by the following methods:

(a) Absorption Capacity Under No Load:

First, 0.2 g of water-absorbing agent was uniformly placed into a nonwoven-fabric-made bag (60 mm×60 mm) and then immersed into a 0.9 wt % aqueous sodium chloride solution (physiological sodium chloride solution). Sixty minutes later, the bag was drawn up and then drained at 250 G for 3 minutes with a centrifuge, and the weight $W_1$ (g) of the bag was then measured. On the other hand, the same procedure was carried out using no water-absorbing agent, and the resultant weight $W_0$ (g) was measured. Thus, the absorption capacity (g/g) under no load was calculated from these weights $W_1$ and $W_0$ in accordance with the following equation:

absorption capacity (g/g) under no load=(weight $W_1$(g)−weight $W_0$(g))/(weight (g) of water-absorbing agent).

(b) Absorption Capacity Under Heavy Load:

Hereinafter, first, the measurement apparatus as used for measuring the absorption capacity under a heavy load is simply explained while referring to FIG. 1.

As is shown in FIG. 1, the measurement apparatus comprises: a scale 1; a vessel 2 of a predetermined capacity as mounted on the scale 1; an air-inhaling pipe 3; an introducing tube 4; a glass filter 6; and a measurement part 5 as mounted on the glass filter 6. The vessel 2 has an opening part 2a on the top and an opening part 2b on the side. The air-inhaling pipe 3 is inserted in the opening part 2a, and the introducing tube 4 is fitted to the opening part 2b. In addition, the vessel 2 contains a predetermined amount of physiological salt solution 11 (0.9 weight % aqueous sodium chloride solution). The lower end part of the air-inhaling pipe 3 is submerged in the physiological salt solution 11. The glass filter 6 is formed in a diameter of 70 mm. The vessel 2 and the glass filter 6 are connected to each other through the introducing tube 4. In addition, the upper part of the glass filter 6 is fixed so as to be located a little higher than the lower end of the air-inhaling pipe 3. The measurement part 5 comprises: a filter paper 7; a supporting cylinder 8; a wire net 9 as attached to the bottom of the supporting cylinder 8; and a weight 10; and the measurement part 5 is formed by mounting the filter paper 7 and the supporting cylinder 8 (i.e. wire net 9) in this order on the glass filter 6 and further mounting the weight 10 inside the supporting cylinder 8, namely, on the wire net 9. The supporting cylinder 8 is formed in an inner diameter of 60 mm. The wire net 9 is made of stainless steel and formed in 400 mesh (mesh size: 38 gm). An arrangement is made such that a predetermined amount of water-absorbing agent can uniformly be spread on the wire net 9. The weight 10 is adjusted in weight such that a load of 50 g/cm² can uniformly be applied to the wire net 9, namely, to the water-absorbing agent.

The absorption capacity under a heavy load was measured with the measurement apparatus having the above-mentioned constitution. The measurement method is hereinafter explained.

First, predetermined preparatory operations were made, in which, for example, a predetermined amount of the physiological salt solution 11 was placed into the vessel 2, and the air-inhaling pipe 3 was inserted into the vessel 2. Next, the filter paper 7 was mounted on the glass filter 6. On the other hand, in parallel with these mounting operations, 0.9 g of water-absorbing agent was uniformly spread inside the supporting cylinder, namely, on the wire net 9, and the weight 10 was put on this water-absorbing agent.

Next, the wire net 9, namely, the supporting cylinder 8 (in which the water-absorbing agent and the weight 10 were put), was mounted on the filter paper 7.

Then, weight $W_2$ (g) of the physiological salt solution 11, as absorbed by the water-absorbing agent over a period of 60 minutes since the supporting cylinder 8 had been mounted on the filter paper 7, was measured with the scale 1. Then, the absorption capacity (g/g) under a heavy load, at 60 minutes after the initiation of the absorption, was calculated from the above weight $W_2$ in accordance with the following equation:

absorption capacity (g/g) under heavy load=(weight $W_2$(g))/ (weight (g) of water-absorbing agent)

(c) Crosslinking Absorption Property Index

The crosslinking absorption property index was determined in accordance with the below-mentioned equation. A large value of this index shows that the surface-crosslinking agent, as used, has a large molecular weight, and further that the resultant water-absorbing agent is excellent in the balance between the absorption capacities under no load and under a heavy load.
Crosslinking absorption property index=(average molecular weight of surface-crosslinking agent for water-absorbent resin)×(absorption capacity (g/g) under no load of resultant water-absorbing agent)×(absorption capacity (g/g) under heavy load of resultant water-absorbing agent)

REFERENTIAL EXAMPLE

A reaction solution to produce a water-absorbent resin having a carboxyl group was prepared by dissolving 4.0 weight parts of polyethylene glycol diacrylate (n=8) (as the internal-crosslinking agent) into 5,500 parts of a 33 weight % aqueous solution of sodium acrylate (neutralization ratio: 75 mol %) (as the monomer component). Next, this reaction solution was degassed under a nitrogen gas atmosphere for 30 minutes.

Then, the reaction solution was supplied into a reaction vessel as prepared by capping a stainless-steel-made double-arm type kneader having two sigma type wings and a jacket. While maintaining the reaction solution at 30° C, the atmosphere inside the above reaction vessel was replaced with a nitrogen gas. Next, while the reaction solution was stirred, 2.4 parts of ammonium persulfate and 0.12 parts of L-ascorbic acid were added to the reaction solution, so that a polymerization reaction got started about 1 minute after. The polymerization was carried out at 30–80° C., and the resultant hydrogel polymer was got out 60 minutes after the initiation of the polymerization.

The resultant hydrogel polymer was spread on a wire net of 300 μm in mesh size and dried at 150° C. with hot air for 90 minutes. Then, the resultant dried product was pulverized with a vibration mill and further classified with a wire net of 500 μm in mesh size, thus obtaining water-absorbent resin (1) as pulverized into the irregular shape with an average particle diameter of 400 μm, wherein 0.5 weight % of water-absorbent resin (1) had a particle diameter less than 150 μm, and the absorption capacity under no load of water-absorbent resin (1) was 47 g/g.

EXAMPLE 1

One hundred weight parts of water-absorbent resin (1), as obtained in Referential Example, was mixed with a crosslinking agent solution comprising 0.15 weight part of crosslinking agent (A) of formula (2) below (m=1; n=11 on the average; X, Y=glycidyl group; average molecular weight=1,450; Denacol EX-810HM, made by Nagase Chemicals, Ltd.), 3 weight parts of water, and 1 weight part of isopropyl alcohol. The resultant mixture was heated at 150° C. for 40 minutes to obtain water- absorbing agent (1), of which the properties were measured, and results thereof are shown in Table 1.

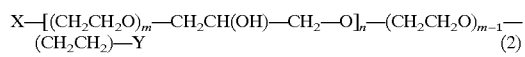
(2)

EXAMPLE 2

One hundred weight parts of water-absorbent resin (1), as obtained in Referential Example, was mixed with a crosslinking agent solution comprising 0.15 weight part of crosslinking agent (A), 6 weight parts of water, and 1 weight part of isopropyl alcohol. The resultant mixture was heated at 150° C. for 40 minutes to obtain water-absorbing agent (2), of which the properties were measured, and results thereof are shown in Table 1.

EXAMPLE 3

An aqueous solution was prepared by dissolving 1 weight part of crosslinking agent (A) (as used in Example 1) into 40 weight parts of water and then heated at 80 aC for 20 hours to open the epoxy group with water, thus obtaining crosslinking agent (B) of general formula (2) below (m=1; n=11 on the average; X/Y=—O—CH$_2$—CH(OH)—CH$_2$OH; average molecular weight=1,468):

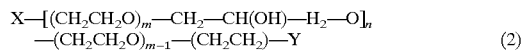
(2)

One hundred weight parts of water-absorbent resin (1) (as obtained in Example 1) was mixed with an aqueous crosslinking agent solution comprising 0.15 weight part of crosslinking agent (B), 6 weight parts of water, and 1 weight part of isopropyl alcohol. The resultant mixture was heated at 190° C. for 120 minutes to obtain water-absorbing agent (3), of which the properties were measured, and results thereof are shown in Table 1.

COMPARATIVE EXAMPLE 1

The same operation as of Example 1 was carried out except that crosslinking agent (A) was replaced with 0.1 weight part of ethylene glycol diglycidyl ether (Denacol EX-810, made by Nagase Chemicals, Ltd.; molecular weight=174). The resultant mixture was heated at 150° C. for 40 minutes to obtain comparative water-absorbing agent (1), of which the properties were measured, and results thereof are shown in Table 1.

COMPARATIVE EXAMPLE 2

The same operation as of Example 1 was carried out except that crosslinking agent (A) was replaced with 0.24 weight part of polyethylene glycol diglycidyl ether (Denacol EX-830, made by Nagase Chemicals, Ltd.; molecular weight=526). The resultant mixture was heated at 150° C. for 40 minutes to obtain comparative water-absorbing agent (2), of which the properties were measured, and results thereof are shown in Table 1.

COMPARATIVE EXAMPLE 3

The same operation as of Example 2 was carried out except that crosslinking agent (A) was replaced with 0.24 weight part of polyethylene glycol diglycidyl ether (Denacol EX-830, made by Nagase Chemicals, Ltd.; molecular weight=526). The resultant mixture was heated at 150° C. for 40 minutes to obtain comparative water-absorbing agent (3), of which the properties were measured, and results thereof are shown in Table 1.

COMPARATIVE EXAMPLE 4

The same operation as of Example 1 was carried out except that crosslinking agent (A) was replaced with 0.53 weight part of polyethylene glycol diglycidyl ether (Denacol EX-861, made by Nagase Chemicals, Ltd.; molecular weight=1,098). The resultant mixture was heated at 150° C. for 40 minutes to obtain comparative water-absorbing agent (4), of which the properties were measured, and results thereof are shown in Table 1.

COMPARATIVE EXAMPLE 5

The same operation as of Example 2 was carried out except that crosslinking agent (A) was replaced with 0.53 weight part of polyethylene glycol diglycidyl ether (Denacol EX-861, made by Nagase Chemicals, Ltd.; molecular weight=1,098). The resultant mixture was heated at 150° C. for 40 minutes to obtain comparative water-absorbing agent (5), of which the properties were measured, and results thereof are shown in Table 1.

TABLE 1

| | Molecular weight of crosslinking agent | Absorption capacity under no load (g/g) | Absorption capacity under heavy load (g/g) | Crosslinking absorption property index ($\times 10^3$) |
|---|---|---|---|---|
| Water-absorbing agent (1) | 1,450 | 40 | 27 | 1,566 |
| Water-absorbing agent (2) | 1,450 | 36 | 29 | 1,513 |
| Water-absorbing agent (3) | 1,468 | 35 | 27 | 1,387 |
| Comparative water-absorbing agent (1) | 174 | 36 | 28 | 175 |
| Comparative water-absorbing agent (2) | 526 | 45 | 11 | 260 |
| Comparative water-absorbing agent (3) | 526 | 44 | 11 | 255 |
| Comparative water-absorbing agent (4) | 1,098 | 47 | 10 | 516 |
| Comparative water-absorbing agent (5) | 1,098 | 47 | 10 | 516 |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A production process for a water-absorbing agent comprising the steps of mixing a water-absorbent particulate resin with a crosslinking agent and heating the resultant mixture, wherein the water-absorbent particulate resin has a carboxyl group;

with the process being characterized in hat the crosslinking agent has a group reactable upon the carboxyl group, all average molecular weight of 500 or more, and a repeating structural unit of general formula (1) below:

$$—((—CH_2CH_2O)_m—CH_2—CH(OH)—CH_2—O)— \qquad (1)$$

wherein m is an integer of 1 to 10; and wherein said group that is reactable upon the carboxyl group is selected from the group consisting of epoxy and hydroxyl groups.

2. A production process according to claim 1, wherein the group, reactable upon the carboxyl group, in the crosslinking agent is an epoxy group.

3. A production process according to claim 2, wherein the crosslinking agent has 2 or more epoxy groups.

4. A production process according to claim 1, wherein the average molecular weight of the crosslinking agent is 1,000 or more.

5. A production process for a water-absorbing agent, comprising the steps of mixing a water-absorbent particulate resin with a crosslinking agent and heating the resultant mixture, wherein the water-absorbent particulate resin has a carboxyl group;

with the process being characterized in that the crosslinking agent has an average molecular weight of 500 or more and is shown by general formula (2) below:

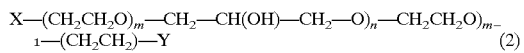
(2)

wherein:

m is an integer of 1 to 10;

X and Y are units that include a functional group reactable upon a carboxyl group, wherein X and Y may be either the same as or different from each other;

wherein each of X and Y is an RO group, wherein R is a glycidyl group, its hydrolysate, or a hydrogen atom; and n is an integer of 3 or more.

6. A production process according to claim 5, wherein R is a glycidyl group.

7. A production process according to claim 5, wherein m is 1.

8. A production process according to claim 5, wherein the average molecular weight of the crosslinking agent is 1,000 or more.

9. A production process for a water-absorbing agent having an absorption capacity of 20 (g/g) or more under a heavy load, comprising the steps of mixing a water-absorbing particulate resin with a crosslinking agent and heating the resultant mixture, wherein the water-absorbent particulate resin has a carboxyl group;

with the process being characterized in that the crosslinking agent is a polyepoxy compound which has at least two epoxy groups and at least two hydroxyl groups and an average molecular weight of 1,000 or more.

10. A production process for a water-absorbing agent, comprising the steps of mixing a water-absorbent particulate resin with a surface-crosslinking agent and heating the resultant mixture, wherein the water-absorbent particulate resin has a carboxyl group, and wherein the surface-crosslinking agent includes at least two epoxy groups or at least two hydroxyl groups;

with the process being characterize in that the surface-crosslinking agent has no cationic group and in that the resultant water-absorbing agent displays a crosslinking absorption property index of 1,000×10, or more, wherein the index is defined by the following equation:

$$\text{crosslinking absorption property index} = A \times B \times C$$

wherein:

A is an average molecular weight of the surface-crosslinking agent for the water-absorbent particulate resin;

B is an Absorption capacity (g/g) under no load of the resultant water-absorbent agent;

C is an absorption capacity (g/g) under a heavy load of the resultant water- absorbing agent.

11. A production process according to claim 1, wherein the water-absorbent particulate resin has a water content in the range of about 1 to about 400%.

12. A production process according to claim 5, wherein the water-absorbent particulate resin has a water content in the range of about 1 to about 400%.

13. A production process according to claim 9, wherein the water-absorbent particulate resin has a water content in the range of about 1 to about 400%.

14. A production process according to claim 10, wherein the water-absorbent particulate resin has a water content in the range of about 1 to about 400%.

15. A production process according to claim 1, wherein particles of the water-absorbent particulate resin have irregular pulverized shapes.

16. A production process according to claim 5, wherein particles of the water-absorbent particulate resin have irregular pulverized shapes.

17. A production process according to claim 9, wherein particles of the water-absorbent particulate resin have irregular pulverized shapes.

18. A production process according to claim 10, wherein particles of the water-absorbent particulate resin have irregular pulverized shapes.

* * * * *

UNITED STATES PATENT AND TRADEMARK OFFICE
CERTIFICATE OF CORRECTION

PATENT NO. : 6,265,488 B1
DATED : July 24, 2001
INVENTOR(S) : Fujino, Shinichi; Nakamura, Masatoshi; and Nagasuna, Kinya It is certified that error appears in the above-identified patent and that said Letters Patent is hereby corrected as shown below:

Column 3,
Line 22, "$CH_2CH_2O)_{m-1}$" should be corrected to -- $CH_2CH_2O)_{\dot{m}-1}$ --.

Column 9,
Line 64, "suffoxides" should be corrected to -- sulfoxides --.

Column 10,
Line 40, "y-" should be corrected to -- $\gamma$ - --.

Column 16,
Line 40, "in hat" should be corrected to -- in that --.
Line 42, "all average" should be corrected to -- an average --.

Column 18,
Line 1, "1,000 x 10" should be corrected to -- $1,000 \times 10^3$ --.
Line 2, "wherein 1 he" should be corrected to -- wherein the --.

Signed and Sealed this

Twenty-sixth Day of March, 2002

*Attest:*

*Attesting Officer*

JAMES E. ROGAN
*Director of the United States Patent and Trademark Office*